United States Patent [19]

Clausen

[11] Patent Number: 4,856,824
[45] Date of Patent: Aug. 15, 1989

[54] METHOD OF MANUFACTURE OF MANIFOLDS AND MANIFOLD PROVIDED BY SUCH METHOD

[75] Inventor: Edvin L. Clausen, Tonder, Denmark

[73] Assignee: Norsk Hydro a.s., Oslo, Norway

[21] Appl. No.: 161,392

[22] Filed: Feb. 22, 1988

Related U.S. Application Data

[60] Continuation of Ser. No. 890,950, Jul. 31, 1986, abandoned, which is a division of Ser. No. 833,711, Feb. 27, 1986, Pat. No. 4,633,812.

[51] Int. Cl.⁴ .......................... F16L 39/00; F28F 9/02
[52] U.S. Cl. .................................. 285/137.1; 29/157.4; 165/173; 165/176; 72/267; 285/188; 285/189
[58] Field of Search ................ 72/267, 254, 264, 370; 29/156.4 R; 285/137.1, 158, 188, 189

[56] References Cited

U.S. PATENT DOCUMENTS

| | | | |
|---|---|---|---|
| 999,147 | 7/1911 | Bonine | 165/176 |
| 1,871,256 | 8/1932 | Bulkeley | 165/176 |
| 1,906,953 | 5/1933 | Enghauser . | |
| 2,086,125 | 7/1937 | Ewing . | |
| 2,302,115 | 11/1942 | Gazey | 72/354 |
| 2,550,560 | 1/1946 | Heron . | |
| 2,762,635 | 9/1956 | Lorber | 165/176 X |
| 2,913,107 | 11/1959 | Biginelli | 72/267 |
| 2,973,944 | 3/1961 | Etter | 165/176 X |
| 3,210,984 | 10/1965 | Arbogast | 72/267 X |
| 3,262,497 | 7/1966 | Worthen et al. | 165/176 |
| 3,499,484 | 3/1970 | Lanzoni | 165/176 X |
| 3,553,994 | 1/1971 | Mohestam | 72/267 X |
| 3,668,757 | 6/1972 | Rieder | 72/267 X |
| 3,740,813 | 6/1973 | Moore | 29/157 T |
| 3,741,849 | 6/1973 | Hardy . | |
| 3,835,920 | 9/1974 | Mondt | 165/176 X |
| 4,043,015 | 8/1977 | Hickman et al. | 285/137.1 |
| 4,152,818 | 5/1979 | Mort et al. | 29/157.3 C |
| 4,166,373 | 9/1979 | Braun | 72/267 X |
| 4,246,772 | 1/1981 | Moshnin et al. . | |
| 4,270,374 | 6/1981 | Kugler . | |
| 4,290,413 | 9/1981 | Goodman et al. | 126/426 |
| 4,368,634 | 1/1983 | Brown et al. | 72/267 X |
| 4,475,586 | 10/1984 | Grieb et al. | 165/176 X |
| 4,680,845 | 7/1987 | Miller | 29/157 R |

FOREIGN PATENT DOCUMENTS

| | | |
|---|---|---|
| 122392 | 2/1984 | European Pat. Off. . |
| 362055 | 10/1922 | Fed. Rep. of Germany . |
| 651101 | 10/1937 | Fed. Rep. of Germany . |
| 197799 | 11/1957 | Fed. Rep. of Germany . |
| 1021535 | 7/1950 | France . |
| 1145575 | 3/1957 | France . |
| 1280264 | 5/1962 | France . |
| 1534065 | 7/1968 | France . |
| 2234539 | 1/1975 | France . |
| 2287670 | 5/1976 | France . |
| 2508138 | 12/1982 | France . |
| 548189 | 9/1956 | Italy . |
| 60-15038 | 1/1985 | Japan . |
| 101502 | 6/1962 | Netherlands . |
| 197119 | 5/1923 | United Kingdom . |
| 390296 | 4/1933 | United Kingdom . |
| 518403 | 2/1940 | United Kingdom . |
| 857526 | 12/1960 | United Kingdom . |
| 2072291 | 9/1981 | United Kingdom . |
| 2078361 | 1/1982 | United Kingdom . |

Primary Examiner—Ira S. Lazarus
Assistant Examiner—Richard R. Cole
Attorney, Agent, or Firm—Wenderoth, Lind & Ponack

[57] ABSTRACT

An integral manifold for a heat exchanger is formed from a hollow shape having a plurality of individual risers, initially having substantially solid cross-sections and subsequently reshaped by means of a reverse impact extrusion process into hollow risers. The walls of the hollow shape under the hollow risers are perforated, thus forming apertures constituting inlets connecting the cavity of the hollow shape with the individual hollow risers.

4 Claims, 7 Drawing Sheets

METHOD OF MANUFACTURE OF MANIFOLDS AND MANIFOLD PROVIDED BY SUCH METHOD

This application is a continuation of now abandoned application Ser. No. 890,950, filed July 31, 1986 now abandoned which is a division of Ser. No. 833,711 filed Feb. 27, 1986 now U.S. Pat. No. 4,633,912.

FIELD OF THE INVENTION

The present invention relates to a manifold, particularly a manifold for a heat exchanger, comprising a hollow body having a plurality of hollow risers for connection to heat exchanger tubes.

BACKGROUND OF THE INVENTION

Connections between manifold/header plate and tubes in heat exchangers employed, e.g. as condensers or radiators in a vehicle, are in principle provided by two methods, i.e. soldering/brazing or mechanical expansion of the tubes after their insertion into the manifold or header plate. All methods are at the present time characterized by several problems related to the providing of a reliable, leakage-proof connection having satisfactory mechanical strength.

GB Pat. No. 1,492,555 describes a heat exchanger for vehicles based upon a mere expansion connection between the tubes and the manifold without use of supplementary rubber packing. The construction is characterized by a precisely specified interaction between a number of parameters such as wall thickness, tube diameter, material strength, length of support and others expressed by empirical formulas. This construction requires high tolerance from the components, and furthermore it has obvious limitations with regard to free choice of materials, wall thickness, tube diameter, etc.

A further disadvantage of the disclosed construction is represented by the process employed for making fastening apertures in the tube wall. The wall is "knocked down" and pressed and drawn further inwards to form a collar or flange which ensures the necessary support or backing area for fastening of a heat exchanger tube. The height of the collar is related to the wall thickness of the manifold, which gives poor possibilities of achieving an adequate collar height on thin-walled manifolds due to the limited material mass which can be transferred in the deformation zone.

Limited material flow is also the disadvantage of the so-called T-drill or Flow-drill processes, where by means of special tools the manifold tube is perforated and a low collar is formed. Depending on the type of tool employed, this collar is formed on the outside or both of the innerside and on the outside of the manifold. In those cases where the collar protrudes inwards into the manifold the available, free cross-section of the manifold is reduced and an increased pressure drop in the heat exchanger arises due to turbulent currents in the manifold.

Additionally to the above mentioned disadvantages also several other problems arise by brazing of the heat exchanger tubes to such manifolds. Because of the short collar a penetration of brazing material and flux along the tubes into the manifold occurs quite frequently, which further contributes to the reduction of the available, free cross-section. Flux residues being entrapped in this way are difficult to remove and they have a corrosion promoting effect on the components. Furthermore, it is difficult to achieve a tight and rigid connection because of the relatively short available brazing length. In the case of inwards protruding brazing hollow risers it is difficult to control the amount of heat since the joining zone is concealed in the manifold. Differences in wall thickness between the joined components represents another obstacle to achieving a proper control over heat balance in the joining process. Overheating of the tubes and mechanical weakening of the connection as a result of this, therefore represents an imminent danger of a high reject rate by manufacture of heat exchangers according to this principle.

Co-pending U.S. patent application Ser. No. 793,285 filed Oct. 31, 1985 discloses still another manifold construction and method of its manufacture. The construction is characterized by provision of a shaped tube with an outwardly, longitudinally extending protrusion which forms an integral portion of fastening flanges for the heat exchanging tubes. The resulting manifolds overcome the above mentioned disadvantages, ensuring leakage-proof and rigid connection to the heat exchanger tubes. However, the disclosed manufacturing method and resulting manifold design do not offer a flexible solution with regard to current, alternative methods of joining manifolds to heat exchanger tubes. This manifold design, for example, allows only for insertion of tubes into the fastening flanges so that not all presently installed industrial assembling lines can be used for the subsequent brazing process.

There is still another known process of manifold manufacture where hollow risers are provided by a step wise deep drawing operation performed on aluminum sheet material. The reworking steps in this process are bending of the sheet and welding of butted sheet ends in order to form a tube. A weakness of this construction is a longitudinally running welded seam which does not provide a reliable and tight rigid joint under high pressure in heat exchangers. The thickness of the applied sheet limits also in this case the achieved maximum length of the risers.

OBJECT OF THE INVENTION

The object of the present invention is to provide a new and improved integrated manifold having a plurality of individual hollow risers for connection to heat exchanger tubes, where the tubes can be positioned both inside and outside of the hollow risers, and where the manifold is formed of an extruded shape having no longitudinally extending welds.

BRIEF DESCRIPTION OF THE DRAWINGS

The above and other objects and advantages of the present invention will become apparent from the following description taken in connection with the accompanying drawings, wherein.

DESCRIPTION OF THE PREFERRED EMBODIMENTS

Figure 1:
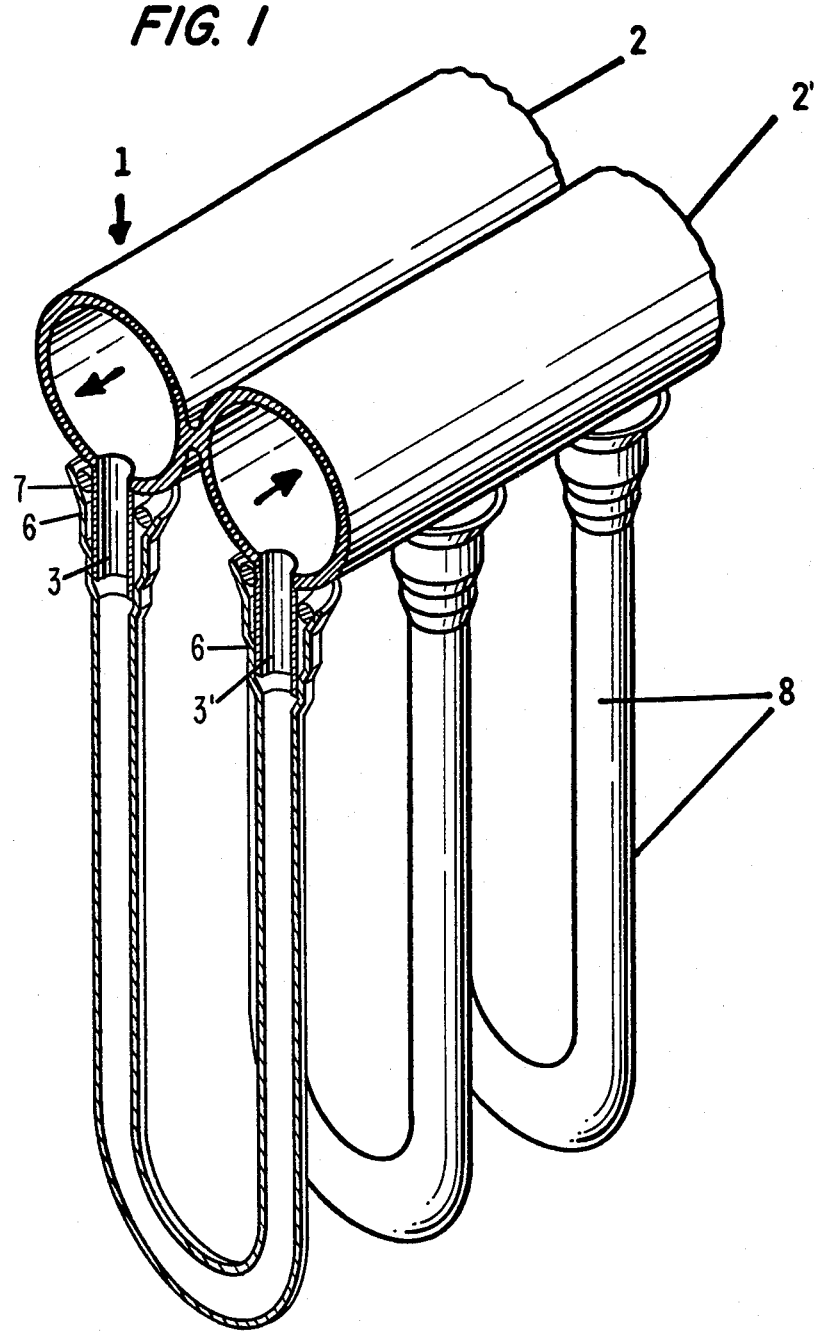
FIG. 1 is a fragmentary view partially in cross-section of a manifold and attached heat exchanger tubes.

FIG. 1 shows in vertical cross-section a manifold according to the present invention. The manifold (1) is shown as two co-extruded, hollow shapes (2,2') constituting respectively inlet and outlet tubes for circulation of cooling medium in a heat exchanger, e.g. a condenser. Individual hollow risers (3,3') protruding from surfaces of the hollow shapes (2,2') constitute resting or supporting surfaces for caps (6) formed on the ends of the so-called hairpin tubing (8), connecting the hollow shapes together and forming a circulation path in the heat exchanger. The tapered shape of the caps (6) facilitates insertion and positioning of the hairpin tubing (8) and provides an accomodation for brazing material (7).

Figure 2:
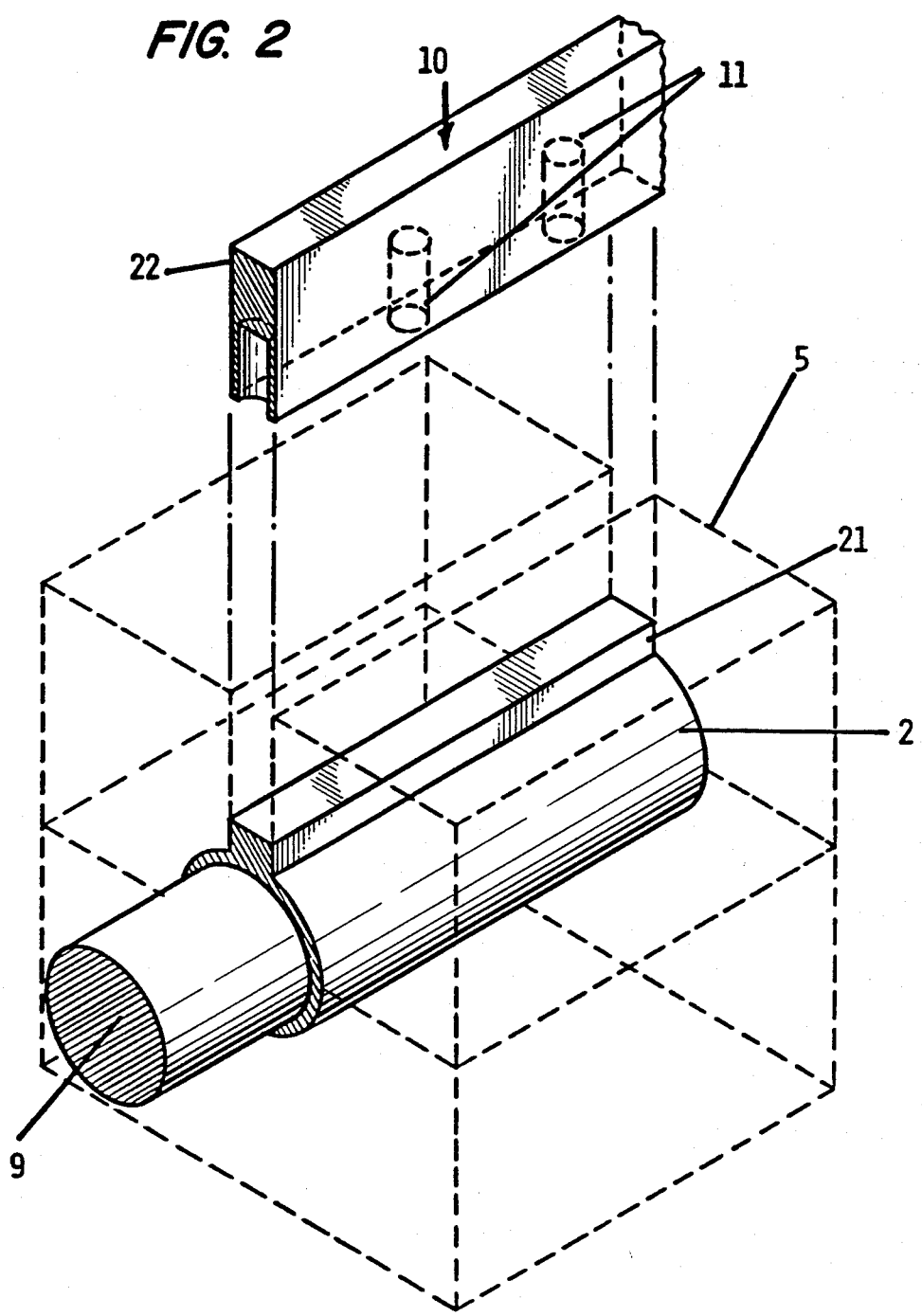
FIGS. 2-6 are schematic views illustrating the individual steps in a manufacturing process for forming such manifold.

FIG. 2 illustrates schematically the first step in the manufacturing process of the manifold. An extruded or possibly drawn hollow shape, shown as a single tube (2) provided with an integral, longitudinally extending neck part (21) and having inserted therein a cylinder (9) complementary shaped and dimensioned to fit the tube interior, is fixed in a fixture device (5). The neck part (21) is then subjected to a cold forming process by means of a press tool (10). The press tool (10), shown schematically and partly in vertical cross-section as an extrusion member (22) having a plurality of cylindrical voids (11), is forced against the neck part (21) of the fixed tube (2). Exposed to such pressure the neck part is subjected to a deformation process resulting in a material flow into the voids (11) in the extrusion member (22) and under formation of individual, cylindrical solid risers.

Figure 3:
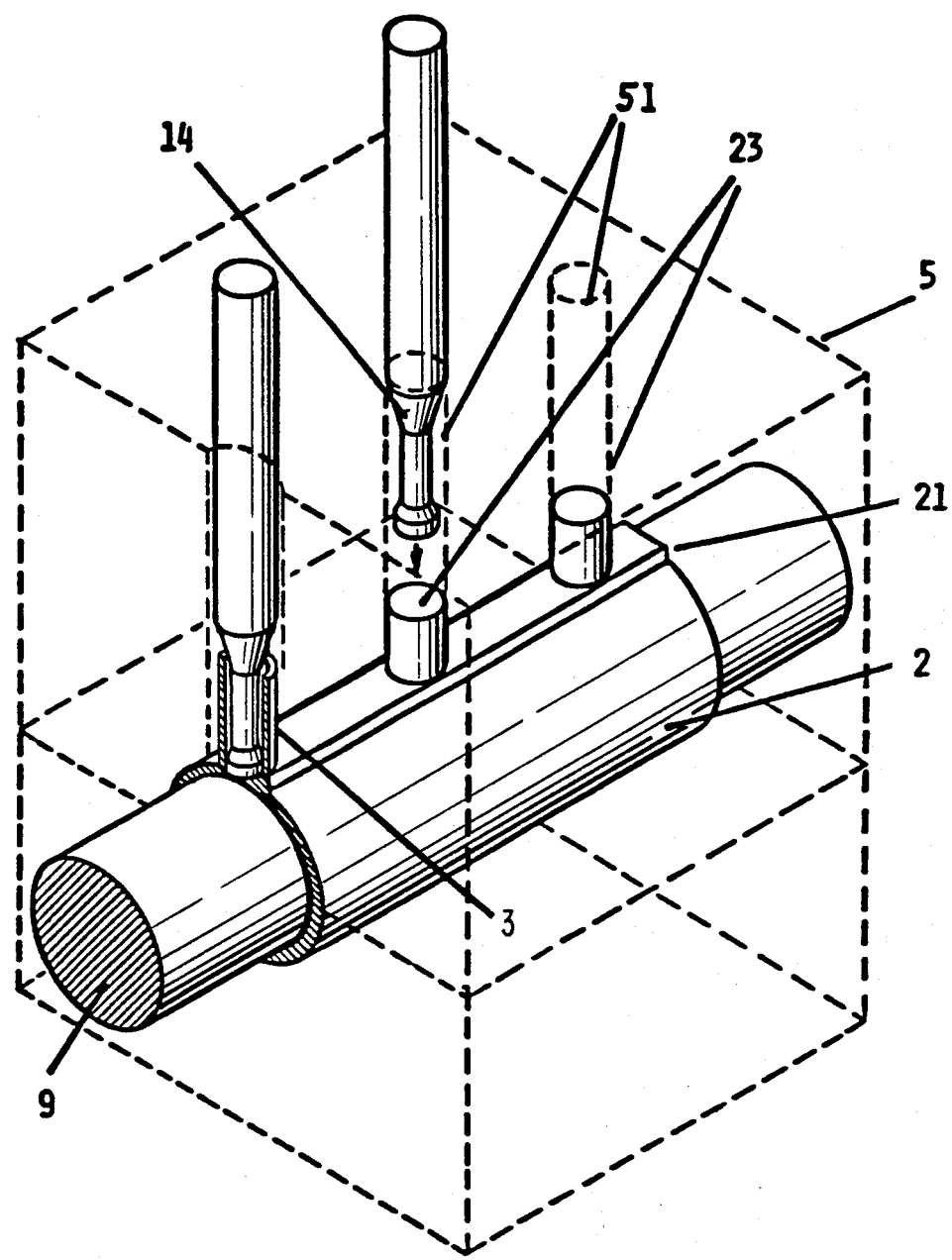

FIG. 3 shows the intermediate product (2) resulting from the first step of manufacturing process positioned in a new fixture arrangement (5) ready for a subsequent process step. The height of the neck part (21) is now substantially reduced and the achieved cylindrical solid risers (23) are subjected to reverse impact extrusion by means of a new set of extrusion tools in the form of a housing mandrels (14). The impact extrusion may be conducted as a sequential operation done by one tool only, as shown for illustration purposes in FIG. 3, or by one operation on all risers (23) using a set of tools. As appears from the drawing, showing in a cross-section final stage of the impact extrusion operation on one of the risers (23), the riser is converted into a thin-walled hollow riser (3) by penetration of the mandrel (14) into the riser and the resulting material flow between the mandrel and the walls of cylindrical voids (51) provided in the upper part of the fixture (5) for each riser (23).

By an appropriate dimensioning of the original neck part (21) and the intermediate solid risers (23), the height and form of the final hollow risers (3) are determined and achieved by this single operation.

Figure 4:
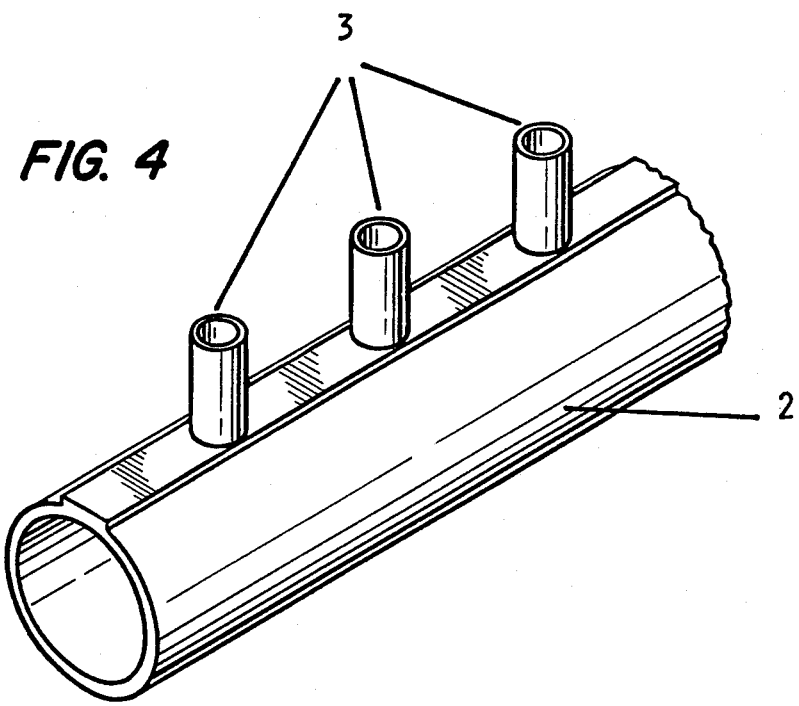
Figure 5:
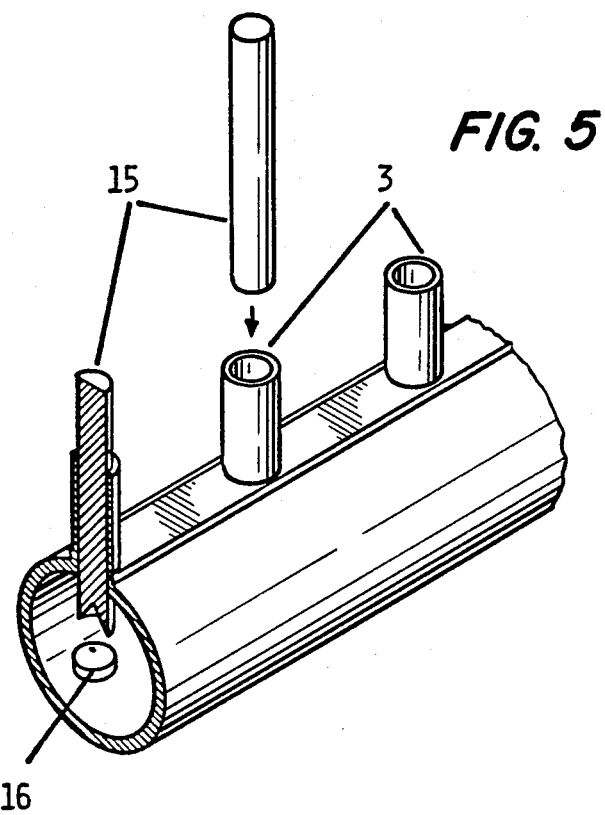

FIG. 4 shows a segment of the manifold tube (2) with three integral, individual hollow risers (3) prior to a final step in the manufacturing process illustrated schematically in FIG. 5.

In FIG. 5 a cutting or perforating tool (15) is applied in order to form apertures under the hollow risers (3) by removing parts (16) of the wall of the manifold tube (2). Free inlets are thus formed, ensuring distribution of medium from the manifold tube to all individual hollow risers.

Figure 6:
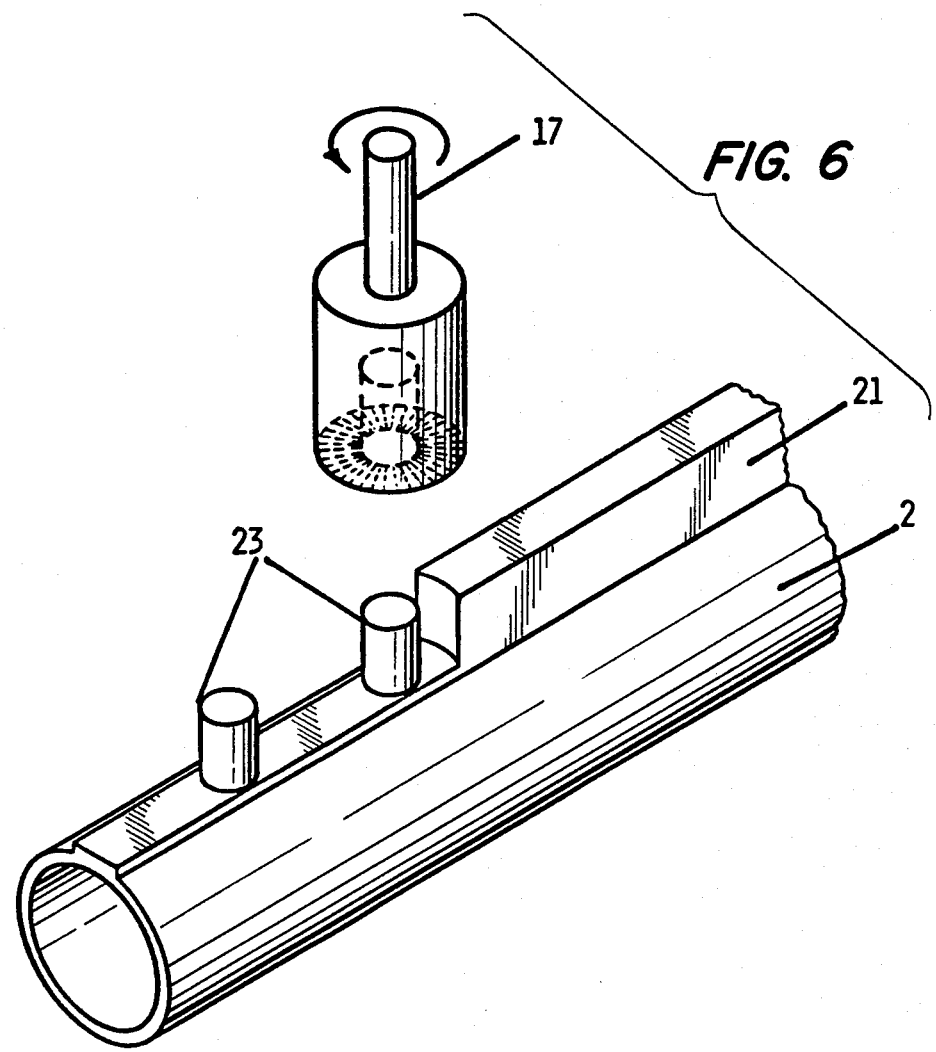

FIG. 6 illustrates an alternative step to the one shown in FIG. 2. Instead of employing an extrusion operation in order to provide individual solid risers (23) from the co-extruded, protruding neck part (21), a specially designed cutting tool (17) is used to remove excess material and form a plurality of discrete risers (23). This operation will of course give a slight increase in the use of material.

Figure 7:
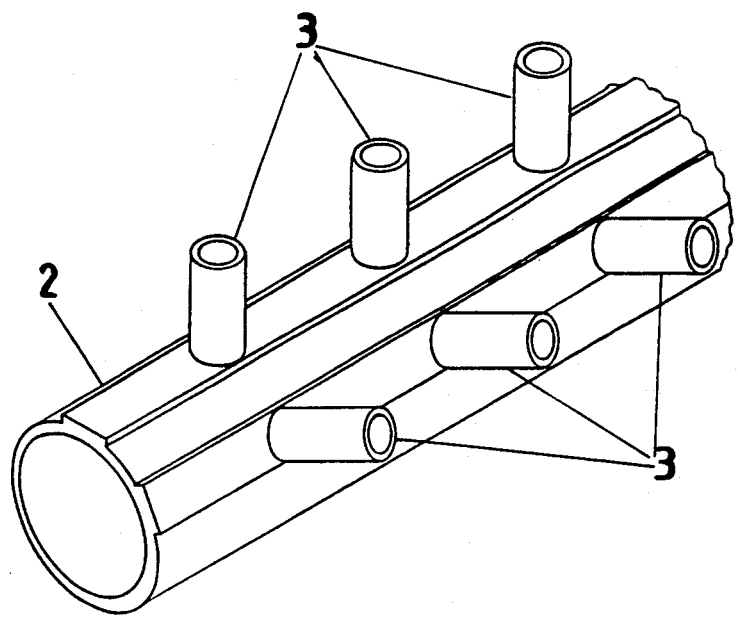
FIG. 7 is a partial perspective view of a modified manifold according to the invention.

From the foregoing it will be apparent that various modifications of the presently illustrated and described manufacturing process and the achieved manifolds may be made of those skilled in the art without departing from the scope of the invention. E.g., the hollow shapes (2) can also be provided as multicavity shapes, or the manifold as an intermediate product can be cut down to pieces providing smaller units, e.g. T-shaped fittings. Further, the hollow shape 2 can be provided with plural rows of hollow risers as shown in FIG. 7.

I claim:
1. A manifold comprising:
   an elongated extruded metallic hollow member having an interior and being free of longitudinally extending seams;
   a plurality of individual hollow risers extending outwardly from the outer surface of said hollow member, said hollow risers being formed integrally from a portion of the material of said hollow member by performing reverse impact extrusion thereof; and
   at least some of said hollow risers having interiors connected to said interior of said hollow member by means of respective apertures extending through said hollow member.
2. A manifold as claimed in claim 1, wherein said hollow risers are arranged in a single row extending longitudinally of said hollow member.
3. A manifold as claimed in claim 1, wherein said hollow risers are arranged in plural rows extending longitudinally of said hollow member.
4. A manifold as claimed in claim 1, wherein said hollow member comprises plural, integrally extruded and connected tubular shaped members.

* * * * *